United States Patent [19]
Etheve

[11] Patent Number: 5,971,097
[45] Date of Patent: Oct. 26, 1999

[54] MUFFLER FOR MOTOR VEHICLES

[76] Inventor: Pierre Etheve, Vilcort, Ronnet, France, 03420

[21] Appl. No.: 09/087,943

[22] Filed: Jun. 1, 1998

Related U.S. Application Data

[63] Continuation-in-part of application No. 08/632,945, Apr. 16, 1996, abandoned.

[30] Foreign Application Priority Data

Apr. 18, 1995 [FR] France .................................. 95 04583

[51] Int. Cl.$^6$ ...................................................... F01N 7/08
[52] U.S. Cl. .......................... 181/227; 181/262; 181/267; 181/279; 181/283
[58] Field of Search ..................................... 181/227, 228, 181/250, 262, 263, 265, 266, 267, 270, 273, 279, 280, 283

[56] References Cited

U.S. PATENT DOCUMENTS

| | | | |
|---|---|---|---|
| 2,055,453 | 9/1936 | Horton | 181/269 |
| 2,185,489 | 1/1940 | Wilman | 181/247 |
| 3,170,280 | 2/1965 | Rees | 181/260 |
| 3,888,331 | 6/1975 | Wang | 181/253 |
| 4,228,868 | 10/1980 | Raczuk | 181/247 |
| 4,317,502 | 3/1982 | Harris | 181/280 |
| 4,485,890 | 12/1984 | Harris et al. | 181/280 |

FOREIGN PATENT DOCUMENTS 807030  12/1936  France .

*Primary Examiner*—Khanh Dang

[57] ABSTRACT

The present invention relates to a muffler used in a motor vehicle for cooling the engine exhaust gases. The muffler has an internal tubular member defining an internal chamber and a middle tubular member concentric in relation to and supported on the internal tubular member. The internal and middle tubular members form a first ring-shaped chamber adapted to connect to the exhaust pipe. The muffler also has an external tubular member being concentric in relation to and supported on the middle tubular member. The middle tubular member and the external tubular member form a second ring-shaped chamber with a third inlet portion. Hence, engine exhaust gases of the motor vehicle pass through the first ring-shaped chamber and are sufficiently cooled and depressurized by cooling air that passes through the internal and second ring-shaped chambers.

19 Claims, 4 Drawing Sheets

MUFFLER FOR MOTOR VEHICLES

This is a continuation-in-part of application Ser. No. 08/632,945 filed Apr. 16, 1996 now abandoned.

FIELD OF THE INVENTION

The present invention relates to in general to an engine muffler device for cooling engine exhaust gases. More particularly, the present invention relates to a muffler used in motor vehicles that is capable of cooling and depressurizing engine exhaust gases before such exhaust gases are released into atmosphere.

BACKGROUND OF THE INVENTION

Various engine muffler devices have been adopted to use in connection with internal combustion engines, such as automobile engines. More specifically, U.S. Pat. Nos. 2,185,489 to Wilman, 3,888,331 to Wang, 4,228,868 to Raczuk and 4,317,502 and 4,485,890 to Harris et al. each disclose an engine muffler that operates to dampen the noises created by the engines.

Moreover, U.S. Pat. No. 3,170,280 to Rees discloses a carbon monoxide eliminator used in the exhaust system of an internal combustion engine. The carbon monoxide eliminator can not only reduce the noise level from the engine but also eliminate carbon monoxide from the products of combustion. The eliminator is designed to introduce fresh air directly into the exhaust system to mix with the carbon monoxide and thus covert carbon monoxide to carbon dioxide before releasing the same into atmosphere. However, none of the above U.S. patents discusses the problem that engine exhaust gases are usually discharged at a high temperature. Such high temperature exhaust gases may cause injuries, such as burning, to pedestrians and damages to the muffler device.

Therefore, it is desirable to provide a muffler that can overcome the deficiencies of conventional designs and thus reduce the temperature of exhaust gases before they are discharged into atmosphere. The present invention provides a muffler device that meets the above requirements.

SUMMARY OF THE INVENTION

The present invention relates to a muffler for a motor vehicle that comprises an internal tubular member forming an internal chamber with a first inlet portion and a middle tubular member being concentric in relation to and supported on the internal tubular member. The internal and middle tubular members form a first ring-shaped chamber with a second inlet portion. The muffler further comprises an external tubular member being concentric in relation to and supported on the middle tubular member. The middle tubular member and the external tubular member form a second ring-shaped chamber with a third inlet portion. According to the present invention, engine exhaust gases of the motor vehicle pass through the first ring-shaped chamber and are sufficiently cooled and depressurized by cooling air that passes through the internal and second ring-shaped chambers.

The muffler of the present invention comprises a helicoid-shaped frame is between the internal and middle tubular members to direct engine exhaust gases. In addition, a plurality of spacer frames are provided between the middle tubular member and the external tubular member. Preferably, the spacer frames are rectilinear.

In a preferred embodiment of the present invention, the internal, middle and external tubular members end successively in that order at the outlet end portion. Moreover, the external tubular member is tapered at the muffler outlet end portion and terminated with a smaller dimension. In alternative, each of the internal, middle and external tubular members is tapered at the muffler outlet portion and terminated with a smaller dimension.

The muffler of the present invention can further comprise a joint member that communicates the first ring-shaped chamber to the engine exhaust pipe.

The present invention also relates to a muffler for a motor vehicle. The muffler comprises a first tubular member defining an internal chamber with a first inlet portion and a second tubular member surrounding and being supported on the first tubular member. The first and second tubular members form a first ring-shaped chamber that has a second inlet portion. Such second inlet portion is adapted to connect to an engine exhaust pipe. The muffler further comprises a third tubular member surrounding and being supported on the second tubular member. The second and third tubular members form a second ring-shaped chamber that has a third inlet portion.

In the present invention, the second inlet portion is closed by a ring-shaped joint member that has at least one opening portion to communicate the first ring-shaped chamber with the engine exhaust pipe. The joint member can further comprise a port member communicating the engine exhaust pipe with the first ring-shaped chamber. The port member has a first end for connecting to the engine exhaust pipe and a second end fit in the opening portion. In a preferred embodiment, the port member is tapered from its first end to its second end.

In another preferred embodiment, the second and third tubular members have flared inlet portions. Moreover, there are two opening portions located diametrically to each other on the joint member.

The present invention further relates to a muffler for cooling engine exhaust gases. The muffler comprises a main body member that has inlet and outlet end portions and consists of internal, middle and external tubular members, which are preferably concentric to one another. The tubular members are telescoped with and supported on one another. The internal tubular member defines an internal chamber with a first open inlet portion. The internal and middle tubular members form a first ring-shaped chamber with a second open inlet portion. The middle and external tubular members form a second ring-shaped chamber with a third open inlet portion. The muffler further comprises a joint member sealing the second open inlet portion of the first ring-shaped chamber and having at least one opening portion adapted to fit with an engine exhaust pipe.

In a preferred embodiment, the joint member is ring-shaped. The tubular members have flared inlet portions and are tapered at the outlet end portion. The internal, middle and external tubular members end successively in that order at the outlet end portion.

BRIEF DESCRIPTION OF THE DRAWINGS

These and other features, aspects, and advantages of the present invention will become much more apparent from the following description, appended claims, and accompanying drawings, in which:

DETAILED DESCRIPTION OF THE PREFERRED EMBODIMENT

Figure 1:
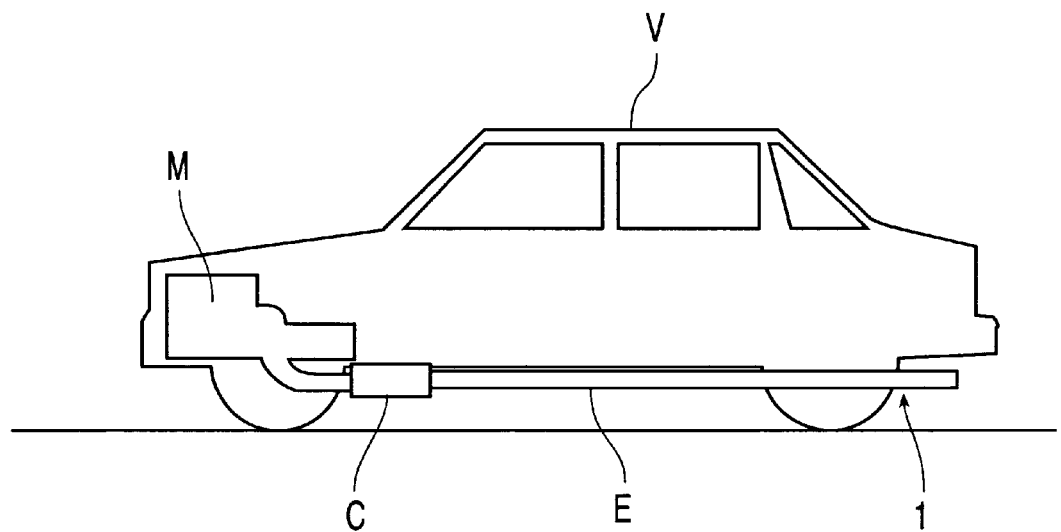
FIG. 1 shows a motor vehicle equipped with the muffler of the present invention.

Various mufflers embodying the principles of the present invention are illustrated in FIGS. 1 to 8. The muffler of the present invention is capable of cooling exhaust gases efficiently. In each embodiment, the same elements are designated with the same reference numerals and repetitive descriptions are omitted.

FIG. 1 shows a motor vehicle V equipped with the muffler of the present invention, which is generally designated by reference numeral 1. The muffler 1 of the present invention replaces a conventional muffler and connects to the catalyzer C and, in turn, the vehicle engine M through an exhaust pipe E.

FIGS. 2–8 illustrate the detailed construction for the muffler 1 of the present invention. As depicted in the drawings, the muffler 1 has three elongated and open end tubular members 2, 3 and 4 that telescope one another. The middle tubular member 3 is spaced from and supported on the internal tubular member 2 through a helicoid-shaped frame 5 while the external tubular member 4 is spaced from and supported on the middle tubular member 3 through a spacer member 6. It is understood that other conventional means can also be employed for supporting the tubular members 2–4 on one another. The tubular members 2–4 so connected form a main body portion 10 of the muffler 1 with inlet and outlet end portions 10a and 10b.

The tubular members 2–4 thus divide the main body portion 10 into different chambers. The internal tubular member 2 defines an internal chamber 12, which is intended to pass cooling air therethrough. The internal and middle tubular members 2 and 3 form a first ring-shaped chamber 14 with an inlet portion 14a. The first ring-shaped chamber 14 is adapted to communicate with the exhaust pipe E of the motor vehicle engine M as will be described below. The middle and external tubular members 3 and 4 form a second ring-shaped chamber 16 which is intended for passing cooling air therethrough.

In addition, a joint member 20 is provided to communicate the first ring-shaped chamber 14 with the engine exhaust pipe E from the inlet end portion 10a of the main body portion 10. The joint member 20 seals a majority of the inlet portion 14a of the first ring-shaped chamber 14. To conduit the exhaust gases from the exhaust pipe E to the first ring-shaped chamber 14, the joint member 20 has an opening portion 22 provided thereon. The opening portion 22 is so sized that it tightly engages with the engine exhaust pipe E. The construction of the muffler 1 of the present invention allows exhaust gases from the motor vehicle engine M to be cooled to thus reduce their volume and pressure before being discharged to atmosphere.

Figure 2:
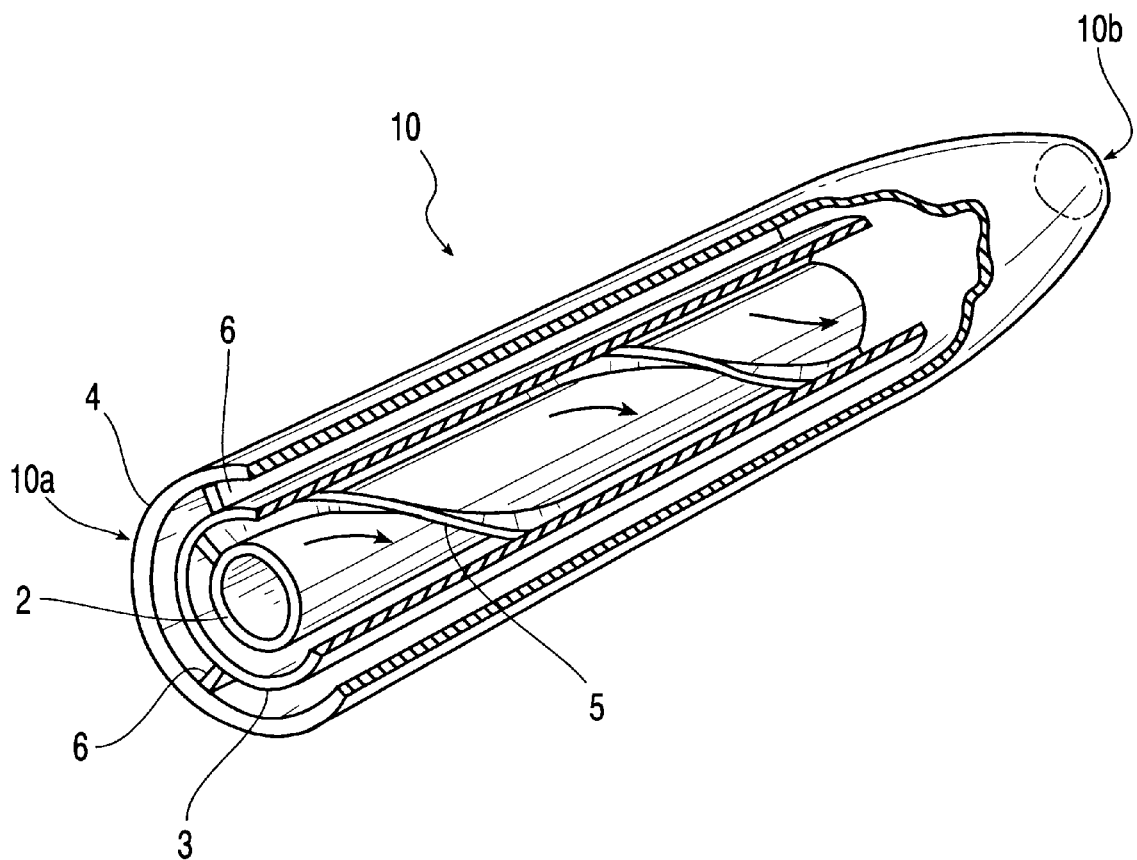
FIG. 2 shows the main body portion of the muffler with part of the external and middle tubular members removed to show the internal tubular member.
Figure 3:
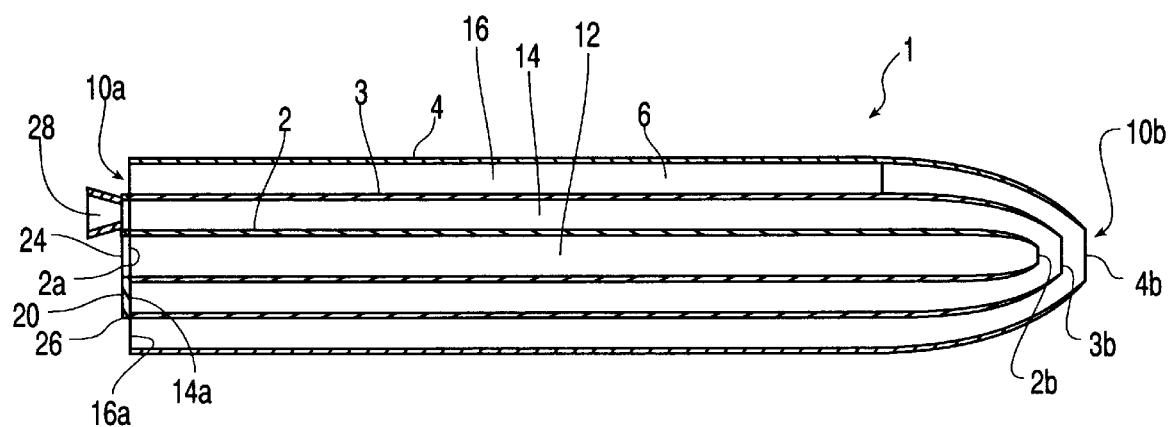
FIG. 3 is a sectional view of the muffler shown in FIG. 2.
Figure 4:
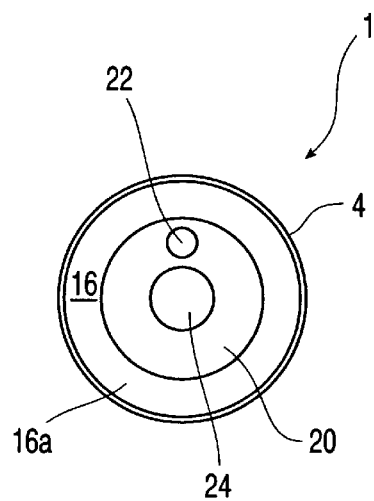
FIG. 4 is an end view of the muffler in FIG. 2.
Figure 5:
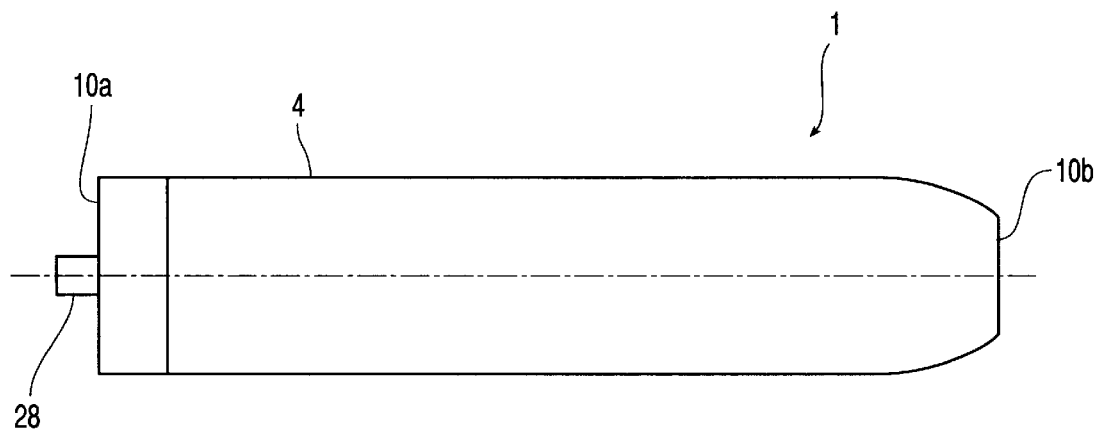
FIG. 5 is an elevation of an alternative preferred embodiment of the present invention.
Figure 6:
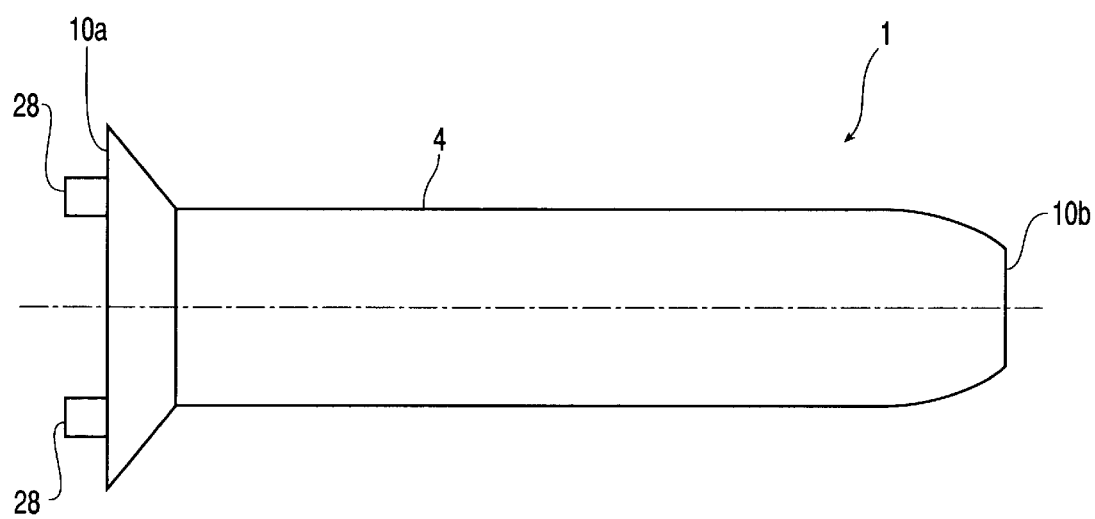
FIG. 6 is a plane view of the muffler in FIG. 5.

FIGS. 2–4 show the first preferred embodiment of the muffler 1. According to this preferred embodiment, the tubular members 2–4 are concentric to one another. The helicoid-shaped frame 5 is made of a rigid material so as to provide support between the internal and middle tubular members 2 and 3. Further, the helicoid frame 5 is preferred to extend substantially through the entire length of the internal tubular member 2. Thereby, exhaust gases passing through the first ring-shaped chamber 14 are directed around the internal tubular member 2 to move along an extended path. In this manner, exhaust gases can be sufficiently cooled.

The spacer frames 6 are preferably rectilinear members. Similar to that of the helicoid frame 5, the spacer frames 6 are also made of a rigid material so as to provide support between the middle and external tubular members 3 and 4. Preferably, the spacer frames 6 extend through the entire length of the middle tubular member 3 to thus provide full support for the tubular members 3 and 4. The spacer frames 6 are preferably oriented along the longitudinally direction of the tubular members 2–4 so as to avoid blocking the passage of cooling air. As partially shown in FIG. 2, there are three rectilinear spacer frames 6 provided that are evenly distributed in the second ring-shaped chamber 16.

As particularly shown in FIG. 3, the internal, middle and external tubular members 2–4 preferably end successively in that order. Thereby, the flowing cooling air exerts a pulling action on exhaust gases when the motor vehicle moves and exhaust gases exert the same action on the cooling air when the motor vehicle stops. With such actions, it is advantageous for fuel saving for the motor vehicle.

In another preferred embodiment shown in FIG. 3, the external tubular member 4 is tapered at its outlet portion 4b and terminated with a smaller dimension. The decreased passage at the outlet portion 4b of the external tubular member 4 creates a depression to the cooling air passing through the second ring-shaped chamber 16 and thus increases the flow speed thereof. More preferably, each of the tubular members 2–4 is tapered at its outlet portion 2b, 3b or 4b and terminated with a smaller dimension to further increase the flow speeds of cooling air and exhaust gases.

FIG. 4 shows that the joint member 20 is a ring-shaped member that seals the inlet portion 14a of the first ring-shaped chamber 14. The inner and outer diameter of the ring-shaped member 20 are preferably the same as those of the internal chamber 2 and the middle chamber 3. Therefore, the center aperture 24 in the ring-shaped joint member 20 allows cooling air to enter the internal chamber 12. Moreover, the outer circumference 26 of the ring-shaped member 20 does not interfere the entrance of cooling air into the second ring-shaped chamber 16 via its inlet portion 16a. It is understood that the joint member 20 may be constructed in other shapes depending on the configuration of the inlet portion 14a of the first ring-shaped chamber 14.

In another preferred embodiment as shown in FIG. 3, the joint member 20 includes a port member 28 for conducting exhaust gases into the first ring-shaped chamber 14. The port member 28 has a first end 28a that joins the engine exhaust pipe E and a second end 28b that joins the opening portion 22 on the joint member 20. In a preferred embodiment, the port member 28 is tapered from its first end 28a to its second end 28b so as to join a large sized engine exhaust pipe E and a smaller sized opening portion 22 on the joint member 20. Other configurations of the port member 28 that can join differently sized engine exhaust pipe E and opening portion 22 on the joint member 20 can also be used. In another preferred embodiment, the port member 28 is integrated at the opening portion 22 of the joint member 20.

FIGS. 5–8 show the second preferred embodiment of the muffler 1. In this preferred embodiment, the middle and external tubular members 3 and 4 are flared. Therefore, the first ring-shaped chamber 14 results in an enlarged inlet portion 14a and, consequently, the joint member 20 sealing at the inlet portion 14a of the first ring-shaped chamber 14 can have an enlarged opening portion 22 thereon.

Such configuration facilitates the communication between the engine exhaust pipe E and the first ring-shaped chamber 14. Even when the engine exhaust pipe E has a larger size than the radial space between the middle and external tubular members 3 and 4, the engine exhaust pipe E can readily and directly connect to the opening portion 22 on the joint member 20. Therefore, there is no need for a tapered port member 28. In another preferred embodiment, all tubular members 2–4 are flared as shown in FIGS. 7 and 8.

Figure 7:
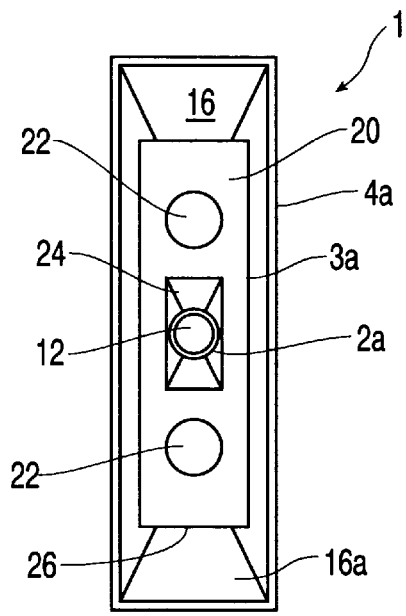
FIG. 7 is an enlarged end view of the muffler shown in FIG. 5.
Figure 8:
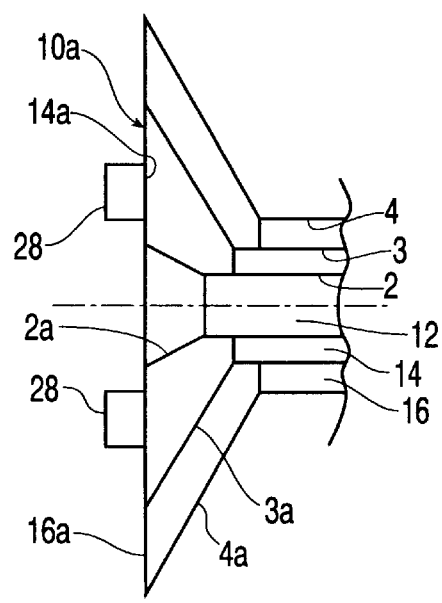
FIG. 8 is a partial sectional view of the inlet end portion of the muffler shown in FIG. 5.

In a preferred embodiment, the inlet end portions 2a, 3a and 4a are so flared that they are terminated with a rectangular shape as shown in FIG. 7. This configuration is advantageous in avoiding a bulky structure at the inlet end portion 10a of the muffler 1. In this embodiment, there are two opening portions 22 provided that are diametrically located to each other. The opening portions 22 are connected to an engine exhaust pipe E that is divided into two branches.

The foregoing description is only illustrative of the principle of the present invention. It is to be recognized and understood that the invention is not to be limited to the exact configuration as illustrated and described herein. Accordingly, all expedient modifications readily attainable by one versed in the art from the disclosure set forth herein that are within the scope and spirit of the present invention are to be included as further embodiments of the present invention. The scope of the present invention accordingly is to be defined as set forth in the appended claims.

What is claimed is:

1. A muffler for a motor vehicle comprising:
   an internal tubular member forming an internal chamber with a first inlet portion;
   a middle tubular member being concentric in relation to and supported on the internal tubular member, the internal and middle tubular members forming a first ring-shaped chamber with a second inlet portion;
   an external tubular member being concentric in relation to and supported on the middle tubular member, the middle tubular member and the external tubular member forming a second ring-shaped chamber with a third inlet portion, and
   a joint member sealing the second inlet portion and comprising an opening portion adapted to communicate with an engine exhaust pipe,
   whereby engine exhaust gases of the motor vehicle pass through the first ring-shaped chamber and are sufficiently cooled and depressurized by cooling air that passes through the internal and second ring-shaped chambers.

2. The muffler according to claim 1, wherein a helicoid-shaped frame is provided between the internal and middle tubular members to direct engine exhaust gases.

3. The muffler according to claim 1 further comprises a plurality of spacer frames provided between the middle tubular member and the external tubular member.

4. The muffler according to claim 3, wherein the spacer frames are rectilinear.

5. The muffler according to claim 1 further comprising an outlet end portion, where the internal, middle and external tubular members end successively in that order.

6. The muffler according to claim 5, wherein the external tubular member is tapered at the muffler outlet end portion and terminated with a smaller dimension.

7. The muffler according to claim 5, wherein each of the internal, middle and external tubular members is tapered at the muffler outlet portion and terminated with a smaller dimension.

8. The muffler according to claim 1 further comprises a joint member that communicates the first ring-shaped chamber to the engine exhaust pipe.

9. A muffler for a motor vehicle comprising:
   a first tubular member defining an internal chamber that has a first inlet portion:
   a second tubular member surrounding and being supported on the first tubular member, the first and second tubular members forming a first ring-shaped chamber that has a second inlet portion; and
   a third tubular member surrounding and being supported on the second tubular member, the second and third tubular members forming a second ring-shaped chamber that has a third inlet portion,
   wherein the second inlet portion is adapted to connect to an engine exhaust pipe, whereby engine exhaust gases of the motor vehicle pass through the first ring-shaped chamber and are sufficiently cooled and depressurized by cooling air that passes through the internal and the second ring-shaped chambers, and wherein the second inlet portion is closed by a ring-shaped joint member that has at least one opening portion to communicate the first ring-shaped chamber with the engine exhaust pipe.

10. The muffler according to claim 9, wherein the joint member further comprises a port member communicating the engine exhaust pipe with the first ring-shaped chamber, the port member having a first end for connecting to the engine exhaust pipe and a second end fit in the opening portion.

11. The muffler according to claim 10, wherein the port member is tapered from its first end to its second end.

12. The muffler according to claim 9, wherein the second and third tubular members have flared inlet portions.

13. The muffler according to claim 9, wherein there are two opening portions located diametrically to each other on the joint member.

14. A muffler for cooling engine exhaust gases comprising:
   a main body member having inlet and outlet end portions and consisting of internal, middle and external tubular members that are telescoped with and supported on one another, the internal tubular member forming an internal chamber with a first open inlet portion, the internal and middle tubular members forming a first ring-shaped chamber with a second open inlet portion and the middle and external tubular members forming a second ring-shaped chamber with a third open inlet portion; and
   a joint member sealing the second open inlet portion of the first ring-shaped chamber and having at least one opening portion adapted to fit with an engine exhaust pipe,
   whereby engine exhaust gases are directed to pass through the first ring-shaped chamber and sufficiently cooled and depressurized by cooling air that passes inside the internal tubular member and between the middle and external tubular members.

15. The muffler according to claim 14, wherein the joint member is ring-shaped.

16. The muffler according to claim 14, wherein the tubular members have flared inlet portions.

17. The muffler according to claim 14, wherein the tubular members are tapered at the outlet end portion.

18. The muffler according to claim 14, wherein the internal, middle and external tubular members end successively in that order at the outlet end portion.

19. The muffler according to claim 14, wherein the internal, middle and external tubular members are concentric to one another.

* * * * *